United States Patent
Pfaadt

(10) Patent No.: US 8,283,394 B2
(45) Date of Patent: *Oct. 9, 2012

(54) PROCESS FOR PRODUCING MOULDINGS FROM CORK PARTICLES

(75) Inventor: Marcus Pfaadt, Burghausen (DE)

(73) Assignee: Wacker Chemie AG, Munich (DE)

( * ) Notice: Subject to any disclaimer, the term of this patent is extended or adjusted under 35 U.S.C. 154(b) by 770 days.

This patent is subject to a terminal disclaimer.

(21) Appl. No.: 12/190,250

(22) Filed: Aug. 12, 2008

(65) Prior Publication Data
US 2008/0300345 A1 Dec. 4, 2008

Related U.S. Application Data

(63) Continuation of application No. PCT/EP2007/051102, filed on Feb. 6, 2007.

(30) Foreign Application Priority Data

Feb. 13, 2006 (DE) .......................... 10 2006 006 579

(51) Int. Cl.
| | |
|---|---|
| *B29C 47/00* | (2006.01) |
| *C08G 18/38* | (2006.01) |
| *C08G 67/02* | (2006.01) |
| *C08L 1/00* | (2006.01) |
| *C08L 97/00* | (2006.01) |
| *C08L 99/00* | (2006.01) |
| *C08K 5/13* | (2006.01) |
| *C09J 197/00* | (2006.01) |

(52) U.S. Cl. ............... 524/13; 524/35; 524/72; 524/612
(58) Field of Classification Search .................. 524/160, 524/13, 35, 72, 612
See application file for complete search history.

(56) References Cited

U.S. PATENT DOCUMENTS

| 4,042,543 A | 8/1977 | Strickman et al. |
| 6,716,922 B1 * | 4/2004 | Dreher et al. ................. 525/191 |
| 2001/0034399 A1 * | 10/2001 | Kohlhammer et al. ....... 524/501 |
| 2007/0037925 A1 * | 2/2007 | Weitzel et al. ................ 524/563 |

FOREIGN PATENT DOCUMENTS

| DE | 1620777 | 9/1970 |
| DE | 213877 | 9/1984 |
| DE | 19629017 A | 1/1998 |
| DE | 19949593 A | 4/2001 |
| JP | 10-259256 A | 9/1998 |
| JP | 2002-194223 A | 7/2002 |
| JP | 2002-254457 A | 9/2002 |
| WO | WO 2004092094 A1 * | 10/2004 |

OTHER PUBLICATIONS

English Abstract corresponding to DE 1620777.
English Abstract corresponding to DE 213877.
English Abstract corresponding to DE 19629017A.
English Abstract corresponding to DE 19949593A.
Fox, T.G., "Influence of Diluent and of Copolymer Composition on the Glass Temperature of a Polymer System," Bull. Am. Phys. Soc. 1 (1956), p. 123.
Schulze, J., TIZ, No. 9, 1985, pp. 3-14.
Lee, W.A. et al "The Glass Transition Temperatures of Polymers," The Polymer Handbook, 2nd Ed., (1975), pp. III-139-III-191.

* cited by examiner

*Primary Examiner* — Mark Eashoo
*Assistant Examiner* — Angela C Scott
(74) *Attorney, Agent, or Firm* — Brooks Kushman P.C.

(57) ABSTRACT

The use of water redispersible thermoplastic polymer powder stabilized with protective colloid as a binder in cork products produced from cork flour or granules allows use of reduced amounts of binder without compromising physical properties.

10 Claims, No Drawings

_US 8,283,394 B2_

PROCESS FOR PRODUCING MOULDINGS FROM CORK PARTICLES

CROSS-REFERENCE TO RELATED APPLICATION

This application is a continuation of PCT Appln. No. PCT/EP2007/051102 filed Feb. 6, 2007 which claims priority to German application DE 10 2006 006 579.4 filed Feb. 13, 2006.

BACKGROUND OF THE INVENTION

1. Field of the Invention

The invention relates to a process for the production of moldings from cork particles, where the cork particles are bonded with thermoplastic polymers.

2. Description of the Related Art

Production of cork stoppers for bottle cork production produces considerable annual amounts of waste cork. These are ground to give cork granules (cork flour) (transfer cork) and serve as an underlying raw material for the production of moldings from cork particles. To this end, the cork particles are mixed with synthetic polymers and then compressed to give moldings.

DE 1 620 777 A discloses that cork moldings can be produced from cork granules and polyurethane. A disadvantage with the use of polyurethane as binder for granular cork is that the moldings thus obtained cannot then be further processed thermoplastically.

DE 196 29 017 likewise relates to the binding of cork particles with polyurethane, but it also describes the use of thermoplastic polymers as binder. The usual thermoplastic binders in cork processing are ethylene vinyl acetate copolymers, polyvinyl chloride and thermoplastic elastomers (TPEs). Thermoplastic polymers permit the thermoplastic processing of cork particles by means of extrusion or calendering. However, a disadvantage is the high proportion of thermoplastic which has to be used in order to obtain the required mechanical strength, mostly from 50 to 70% by weight, based on the total weight of the molding. A further disadvantage is that the high proportion of polymer prevents the moldings from having the appearance of natural cork.

DE 199 49 593 A1 essentially relates to polymeric binders based on a polymer A1 insoluble in water, and on a water-soluble polymer A2, which is composed of from 50 to 100% by weight of ethylenically unsaturated mono- or dicarboxylic acids, where an amine having hydroxy groups functions as crosslinking agent, and the amine is present separately or is present copolymerized in the water-soluble polymer in the form of an ester of an unsaturated carboxylic acid. Heat-curable polymeric binders are involved here, and these bring about the crosslinking of the components of the binders and of the substrate materials, e.g. cork chips, to give the corresponding, hardened moldings. This application does not disclose how moldings with high mechanical strength can be obtained when the binders used comprise thermoplastic polymers which are not hardened during the production of the moldings.

SUMMARY OF THE INVENTION

An object of the invention was therefore to develop a process which can produce moldings from cork particles and thermoplastic polymers and which permits use of smaller amounts of thermoplastic, but nevertheless ensures that the moldings have high mechanical strength, permits further thermoplastic operations on the same, and provides access to moldings with the appearance of natural cork. These and other objects are achieved through the use of protective colloid-stabilized water redispersible thermoplastic polymer powders as a binder for cork particles.

DETAILED DESCRIPTION OF THE PREFERRED EMBODIMENT(S)

The invention thus provides a process for the production of moldings from cork particles, where the cork particles are bonded with thermoplastic polymers, characterized in that the thermoplastic polymer is used in the form of its water-redispersible polymer powder, comprising one or more polymers, based on one or more monomers from the group consisting of vinyl esters, (meth) acrylic esters of unbranched or branched alcohols having from 1 to 15 carbon atoms, vinylaromatics, olefins, 1,3-dienes, and vinyl halides, and, if appropriate, from 0.1 to 5% by weight, based on the total weight of the monomer mixture, of auxiliary monomers; one or more protective colloids from the group consisting of partially hydrolyzed or fully hydrolyzed polyvinyl alcohols, polyvinylpyrrolidones, polyvinyl acetals, starches, celluloses and their derivatives, proteins, such as casein or caseinate, soy protein, gelatin, lignosulfonates, poly(meth)acrylamide, polyvinylsulfonic acids and their water-soluble copolymers, melamine-formaldehydesulfonates, and naphthalene-formaldehydesulfonates; and also, if appropriate, antiblocking agents.

"Water-redispersible polymer powders" is a term used for polymer compositions which are accessible by means of drying of the corresponding aqueous dispersions of polymers in the presence of protective colloids. By virtue of this production process, the fine-particle resin of the dispersion becomes coated with an adequate amount of a water-soluble protective colloid. During drying, the protective colloid acts as a jacket which prevents caking of the particles. On redispersion in water, the protective colloid in turn dissolves in water, giving an aqueous dispersion of the original polymer particles (Schulze J. in TIZ, No. 9, 1985).

Suitable polymers include those based on one or more monomers from the group consisting of vinyl esters, (meth) acrylic esters, vinylaromatics, olefins, 1,3-dienes, and vinyl halides, and, if appropriate, further monomers copolymerizable therewith.

Suitable vinyl esters include those of carboxylic acids having from 1 to 12 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms, examples being VeoVa9® or VeoVa10® (trade mark of Resolution Performance Products). Vinyl acetate is particularly preferred.

Suitable monomers from the group of acrylic esters or methacrylic esters include esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particular preference is given to methyl acrylate, methyl methacrylate, n-butyl acrylate, tert-butyl acrylate, and 2-ethylhexyl acrylate.

Preferred vinylaromatics are styrene, methylstyrene, and vinyltoluene. A preferred vinyl halide is vinyl chloride. The preferred olefins are ethylene and propylene, and the preferred dienes are 1,3-butadiene and isoprene.

It is also possible, if appropriate, to copolymerize from 0.1 to 5% by weight of auxiliary monomers, based on the total weight of the monomer mixture. It is preferable to use from 0.5 to 2.5% by weight of auxiliary monomers. Examples of auxiliary monomers are ethylenically unsaturated mono- and dicarboxylic acids, preferably acrylic acid, methacrylic acid, fumaric acid, and maleic acid; ethylenically unsaturated carboxamides and carbonitriles, preferably acrylamide and acrylonitrile; mono- and diesters of fumaric acid and maleic acid, e.g. the diethyl and diisopropyl esters, and maleic anhydride, ethylenically unsaturated sulfonic acids or their salts, preferably vinylsulfonic acid or 2-acrylamido-2-methylpropanesulfonic acid. Further examples are precrosslinking comonomers, such as ethylenically polyunsaturated comonomers, e.g. diallyl phthalate, divinyl adipate, diallyl maleate, allyl methacrylate, or triallyl cyanurate, or post-crosslinking comonomers, e.g. acrylamidoglycolic acid (AGA), methyl methacrylamidoglycolate (MAGME), N-methylolacrylamide (NMA), N-methylolmethacrylamide, allyl N-methylolcarbamate, alkyl ethers, such as isobutoxy ether, or esters of N-methylolacrylamide, of N-methylolmethacrylamide, and of allyl N-methylolcarbamate. Epoxy-functional comonomers are also suitable, examples being glycidyl methacrylate and glycidyl acrylate. Further examples are silicon-functional comonomers, such as acryloxypropyltri(alkoxy)- and methacryloxypropyltri(alkoxy)silanes, vinyltrialkoxysilanes, and vinylmethyldialkoxysilanes, where the alkoxy groups present can by way of example be ethoxy and ethoxypropylene glycol ether radicals. Mention may also be made of monomers having hydroxy groups or having CO groups, examples being hydroxyalkyl esters of methacrylic and acrylic acids, e.g. hydroxyethyl, hydroxypropyl, or hydroxybutyl acrylate or the corresponding methacrylate, and also compounds such as diacetoneacrylamide and acetylacetoxyethyl acrylate or the corresponding methacrylate.

The selection of monomer and, respectively, the selection of the proportions by weight of comonomers here is such as generally to give a glass transition temperature Tg of <120° C., preferably from −40° C. to +120° C., most preferably from −20° C. to +80° C. The glass transition temperature Tg of the polymers can be determined in a known manner by means of differential scanning calorimetry (DSC). Tg can also be approximated in advance by means of the Fox equation. According to Fox T. G., Bull. Am. Physics Soc., 1, 3, page 123 (1956): $1/Tg=x1/Tg1+x2/Tg2+\ldots+xn/Tgn$, where xn is the mass fraction (% by weight/100) of the monomer n and Tgn is the glass transition temperature in Kelvin of the homopolymer of the monomer n. Tg values for homopolymers are listed in Polymer Handbook $2^{nd}$ Edition, J. Wiley & Sons, New York (1975).

Preference is given to homo- or copolymers which comprise one or more monomers of vinyl acetate, vinyl esters of α-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene. Particular preference is given to copolymers with vinyl acetate and ethylene; with vinyl acetate, ethylene, and a vinyl ester of α-branched monocarboxylic acids having from 9 to 11 carbon atoms; with n-butyl acrylate and 2-ethylhexyl acrylate, and/or methyl methacrylate; with styrene and with one or more monomers from the group of methyl acrylate, ethyl acrylate, propyl acrylate, n-butyl acrylate, 2-ethylhexyl acrylate; with vinyl acetate and with one or more monomers from the group of methyl acrylate, ethyl acrylate, propyl acrylate, n-butyl acrylate, 2-ethylhexyl acrylate; and, if appropriate, ethylene; with 1,3-butadiene and styrene, and/or methyl methacrylate, and also, if appropriate, with further acrylic esters; where the mixtures mentioned can, if appropriate, also comprise one or more of the abovementioned auxiliary monomers.

The polymers are prepared in a known manner by the emulsion polymerization process or by the suspension polymerization process, in the presence of protective colloids, preferably by the emulsion polymerization process, where the polymerization temperature is generally from 20° C. to 100° C., preferably from 60° C. to 90° C., and in the case of copolymerization of gaseous comonomers, such as ethylene, it is also possible to operate under pressure, generally from 5 bar to 100 bar. The polymerization reaction is initiated with the familiar water-soluble or monomer-soluble initiators or redox-initiator combinations used for emulsion polymerization or suspension polymerization. To control molecular weight, regulating substances can be used during the polymerization reaction. For stabilization, protective colloids are used, if appropriate in combination with emulsifiers.

Examples of familiar protective colloids for stabilization of the polymerization mixture are partially hydrolyzed or fully hydrolyzed polyvinyl alcohols; polyvinylpyrrolidones; polyvinyl acetals; polysaccharides in water-soluble form, e.g. starches (amylose and amylopectin), celluloses and their carboxymethyl, methyl, hydroxyethyl, or hydroxypropyl derivatives; proteins, such as casein or caseinate, soy protein, or gelatin; lignosulfonates; synthetic polymers such as poly(meth)acrylamide, polyvinylsulfonic acids and their water-soluble copolymers, melamine-formal-dehydesulfonates, and naphthalene-formaldehydesulfonates. Preference is given to partially hydrolyzed or fully hydrolyzed polyvinyl alcohols. Particular preference is given to partially hydrolyzed polyvinyl alcohols whose degree of hydrolysis is from 80 to 95 mol % and whose Höppler viscosity in 4% strength aqueous solution is from 1 to 30 mPas (Höppler method at 20° C., DIN 53015).

The solids content of the aqueous dispersions thus obtainable is from 30 to 75% by weight, preferably from 50 to 60% by weight.

For production of the water-redispersible polymer powder compositions, the dispersions are dried, if appropriate after addition of further protective colloids as drying aids, for example by means of fluidized-bed drying, freeze drying, or spray drying. The dispersions are preferably spray-dried. The spray drying here takes place in conventional spray-drying systems, where atomization can take place by means of single-, twin-, or multifluid nozzles or by use of a rotating disk. The discharge temperature is generally selected to be in the range from 45° C. to 120° C., preferably from 60° C. to 90° C., depending on the system, Tg of the resin, and the desired degree of drying. The viscosity of the feed to be sprayed is adjusted by way of the solids content so as to give a value of <500 mPas (Brookfield viscosity at 20 rpm and 23° C.), preferably <250 mPas. The solids content of the dispersion to be sprayed is >35%, preferably >40%.

The total amount of the drying aid used is generally from 0.5 to 30% by weight, based on the polymeric constituents of the dispersion. That means that the total amount of protective colloid prior to the drying procedure is to be at least from 1 to 30% by weight, based on the polymer content; preference is given to use of a total of from 5 to 20% by weight of protective colloid, based on the film-forming polymer content.

Examples of suitable drying aids are the abovementioned protective colloids.

A content of 1.5% by weight of antifoam, based on the underlying polymer, has often proven advantageous during spraying. In order to increase shelf life by improving blocking resistance, in particular in the case of powders with low glass transition temperature, the powder obtained can be equipped with an antiblocking agent (anticaking agent), preference being given to from 1 to 30%, based on the total weight of polymeric constituents. Examples of antiblocking agents are Ca carbonate or Mg carbonate, talc, gypsum, silica, kaolins, such as metakaolin, and silicates whose particle sizes are preferably in the range from 10 nm to 10 μm.

Most preference is given to redispersion powder compositions comprising copolymers with vinyl acetate and ethylene or copolymers with vinyl acetate, ethylene, and a vinyl ester of α-branched monocarboxylic acids having from 9 to 11 carbon atoms, as underlying polymer, and with partially hydrolyzed polyvinyl alcohol as protective colloid.

The cork particles take the form of granules or cork flour whose average grain size is from 0.05 to 500 mm, preferably 0.05 to 50 mm, and most preferably, 0.5 to 5 mm. Other materials especially suitable are cork particles which are a waste product (transfer cork) produced in the production of other cork items, such as bottle corks, and by way of example are converted by means of grinding to the desired grain size.

For the production of the moldings, the water-redispersible polymer powder is mixed with the cork particles, for example in a hot mixer. The proportion of the polymer powder added is from 4 to 70% by weight, preferably from 10 to 60% by weight, most preferably from 10 to 40% by weight, in each case based on the total weight of cork and polymer, and the material is processed by means of the conventional thermoplastic forming techniques, such as extrusion, injection molding, pressing, granulation, and calendering, to give moldings. The processing temperature is generally from 60° C. to 200° C., preferably from 90° C. to 150° C. It is preferable to operate at an elevated pressure.

The mixture can also, if appropriate, comprise further additives, such as lubricants, e.g. calcium stearate, plasticizers, antioxidants, UV stabilizers, dyes, pigments, fillers, processing aids, or peroxides, e.g. peroxodicarbonate, for post-crosslinking. The water-redispersible polymer powder can also be added in a mixture with conventional thermoplastics, elastomers, and thermosets.

The process is suitable for the production of a very wide variety of moldings based on cork. Examples of these are bottle corks, thermal and acoustic insulation materials in sheet form, gaskets, damping materials, wallcoverings, floorcoverings, and office items. Further examples are materials for use in the shoe industry, in the apparel industry, in the furniture industry, in the sports industry, in the leisure industry, and in the construction industry.

A feature of the process is that moldings with high mechanical strength are obtained with relatively small amounts of redispersible polymer powder. By virtue of the small proportion of polymeric binder, the natural appearance of cork is retained. In particular, the polyvinyl alcohol content brings about high mechanical strength in the polyvinyl-alcohol-stabilized redispersible polymer powders mentioned as preferred. Use of polymer powders where Tg of the underlying polymer is from −40° C. to +60° C. gives moldings which feature not only high mechanical strength but also high elasticity.

The examples below serve for further explanation of the invention:

The following materials were used for testing:

Vinnex® LL 2504 redispersible polymer powder from Wacker Chemie AG: A polyvinyl-alcohol-stabilized polymer powder based on a vinyl acetate-ethylene copolymer with Tg of −7° C.

BD 0.5/1 cork from Amorin: Cork particles with grain size of from 0.5 to 1 mm.

Heat-stabilized, plasticized S-PVC with K value of 70 and Shore A hardness of 70.

The materials mentioned were mixed in the quantitative proportions mentioned in the table, and processed to give moldings.

The mixtures were calendered on a Collin two-roll mill at a temperature of from 150° C. to 170° C. to give milled sheets of thickness 1 mm.

The mixtures were pressed using a standard Collin press at a temperature of from 150° C. to 170° C. to give pressed sheets of thickness 4 mm.

The density of the milled sheet was determined to ISO 1183, and the density of the pressed sheets were determined to ISO 1184.

The rebound resilience of the pressed sheets was determined by the ISO 8307 method and the Shore A hardness of the pressed sheets was determined by the ISO 868 method.

The mechanical strength of the milled sheets was determined by the tensile test, and tensile strain was determined to ISO 527-1/2, and ultimate tensile strength was also determined to ISO 527-1/3.

The table collates the results.

TABLE

| Formulation | Ex. 1 | Ex. 2 | Ex. 3 | Comp. Ex. 4 |
|---|---|---|---|---|
| RD powder [pts. by weight] | 20 | 30 | 40 | |
| cork particles [pts. by weight] | 80 | 70 | 60 | 60 |
| S-PVC [pts. by weight] | | | | 40 |
| Density of milled sheet [kg/m$^3$] | 0.4060 | 0.6373 | 0.6028 | 0.6376 |
| Density of pressed sheet [kg/m$^3$] | 0.6469 | 0.6644 | 0.7093 | 0.7044 |
| Rebound resilience [%] | 28 | 24 | 20 | 23 |
| Shore A hardness | 80.5 | 80.5 | 79.8 | 79.6 |
| Tensile strain [%] | 15.75 | 48.77 | 53.52 | 12.08 |
| Ultimate tensile strength | 3.21 | 4.51 | 5.82 | 2.51 |

The tensile test results show that the moldings produced according to the invention give markedly better tensile strain and higher ultimate tensile strength (Example 3), than cork moldings conventionally bonded with PVC (Comparative Example 4).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the production of moldings of polymer-bonded cork particles, comprising binding the cork particles with a thermoplastic polymer binder in the form of a water-redispersible polymer powder comprising one or more thermoplastic polymers of one or more monomers selected from the group consisting of vinyl esters, (meth)acrylic esters of unbranched or branched alcohols having from 1 to 15 carbon atoms, vinylaromatics, olefins, 1,3-dienes, and vinyl halides, and, optionally, from 0.1 to 5% by weight, based on the total weight of the monomer mixture, of auxiliary monomers; one or more protective colloids selected from the group consisting of partially hydrolyzed and fully hydrolyzed polyvinyl alcohols, polyvinylpyrrolidones, polyvinyl acetals, starches, celluloses and their derivatives, proteins, lignosulfonates, poly (meth)acrylamide, polyvinylsulfonic acids and their water-soluble copolymers, melamine-formaldehydesulfonates, and naphthalene-formaldehydesulfonates; and, optionally, antiblocking agent(s).

2. The process of claim 1, wherein the water-redispersible polymer powder comprises a polymer whose glass transition temperature Tg is from −20° C. to +80° C.

3. The process of claim 1, wherein the water-redispersible polymer powder comprises homo- or copolymers of one or more monomers selected from the group consisting of vinyl acetate, vinyl esters of α-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene; and partially hydrolyzed polyvinyl alcohol as a protective colloid.

4. The process of claim 1, wherein the cork particles take the form of granules or cork flour whose grain size is from 0.05 to 5 mm.

5. The process of claim 1, wherein the water-redispersible polymer powder is added in a proportion of from 4 to 70% by weight, based on the total weight of cork and polymer.

6. The process of claim 1, wherein the molding is produced by one or more of extrusion, injection molding, pressing, granulation, and calendering.

7. A molding comprising cork particles, produced by the process of claim 1.

8. The molding of claim 7, which contains from 10 to about 40 weight percent of water redispersible polymer powder.

9. The molding of claim 7, which is a bottle cork, thermal material, acoustic insulation material, cork sheet, gasket, damping material, wallcovering, floorcovering, or office item.

10. The molding of claim 7, which is a component of a shoe, an article of apparel, a furniture piece, a sports product, a leisure article, or a construction article.

* * * * *